United States Patent
Wang et al.

(10) Patent No.: US 7,961,351 B2
(45) Date of Patent: Jun. 14, 2011

(54) METHODOLOGY FOR DEVELOPING COLOR MODELS AND PRINTER SENSITIVITY FUNCTIONS FOR SPOT COLORS AND PROFILES

(75) Inventors: Yao Rong Wang, Webster, NY (US); Lalit Keshav Mestha, Fairport, NY (US); Alvaro Enrique Gil, Rochester, NY (US)

(73) Assignee: Xerox Corporation, Nowalk, CT (US)

( * ) Notice: Subject to any disclaimer, the term of this patent is extended or adjusted under 35 U.S.C. 154(b) by 544 days.

(21) Appl. No.: 12/061,137

(22) Filed: Apr. 2, 2008

(65) Prior Publication Data

US 2009/0251712 A1    Oct. 8, 2009

(51) Int. Cl.
*G06F 15/00* (2006.01)
*G06K 15/00* (2006.01)
*H04N 1/40* (2006.01)
*G03F 3/08* (2006.01)

(52) U.S. Cl. .......... 358/1.9; 358/2.1; 358/3.24; 358/518
(58) Field of Classification Search .................. None
See application file for complete search history.

(56) References Cited

U.S. PATENT DOCUMENTS

| | | | |
|---|---|---|---|
| 7,092,863 B2 * | 8/2006 | Goldman et al. | 703/13 |
| 2004/0165199 A1 * | 8/2004 | Klassen et al. | 358/1.9 |
| 2006/0197966 A1 * | 9/2006 | Viturro et al. | 358/1.9 |
| 2007/0280710 A1 * | 12/2007 | Tainer et al. | 399/44 |

* cited by examiner

*Primary Examiner* — Twyler L Haskins
*Assistant Examiner* — Barbara D Reinier
(74) *Attorney, Agent, or Firm* — Fay Sharpe LLP

(57) ABSTRACT

A method and system is disclosed for developing a printer model from a reduced set of selected test patches. The model corresponds to a spot color editor controller having a sensitivity matrix model developed from a plurality of the patches to define printer operation. The sensitivity matrix is comprised of coefficients computed from an orthogonal disposition of the experimental patches within a selected sub gamut of the color printer gamut. A plurality of replicas of the experimental patches are run for achieving statistical significance.

13 Claims, 2 Drawing Sheets

METHODOLOGY FOR DEVELOPING COLOR MODELS AND PRINTER SENSITIVITY FUNCTIONS FOR SPOT COLORS AND PROFILES

TECHNICAL FIELD

The disclosed embodiments generally relate to methods and systems for printer color management in image/text printing or display systems. The embodiments are directed to processes for developing color models and printer sensitivity functions for spot colors and profiles with a reduced number of color test patches.

BACKGROUND

To meet customer demand, the commercial printing industry requires the capability of producing colors accurately and consistently. Colors can be defined as a fixed set of colors which may be Pantone® colors, customer logo colors, colors in a customer's proprietary marked patterns, or customer defined colors in the form of an index color table. Consistent color in these areas may determine the difference between success and failure in meeting customer requirements. Customer demands for color accuracy and consistency are typically much tighter for spot colors than for colors within images. A printer model for color control requires the mapping between input variables, C, M, Y and K for a xerographic printer, and the output color coordinates, e.g., L*, a*, and b* in the device independent space. More precisely, it is the derivatives (Jacobian) of the output color coordinates to the input variables that provide the ability to accurately control the spot colors. A Jacobian matrix is used to compute the gain matrix of the spot color controller.

Existing spot color editors often utilize a manual approach to the adjustment of CMYK combinations of spot colors prior to raster image processing (RIPing). For example, the document creator may select a Pantone® color for application in specific areas through a user interface on a printing device or computer monitor, such as that available on the Xerox® DocuSP® Controller. The Pantone-provided CMYK combination for the selected printer is obtained from a look-up table. Prior to RIPing the document in the printer, the operator has the option of entering a spot color editor function and specifying an alternative CMYK combination to achieve the desired color. The document is then RIPed and then printed using the spot color editor combinations where specified, and Pantone combinations otherwise.

This workflow presents various problems, among which is operator error associated with manual adjustments of the CMYK combinations; modifications to the CMYK values may result in more variability from machine to machine. Also, the manually-adjusted CMYK values may require more iteration to achieve the desired color. Due to the manual adjustments it may be difficult for customers to achieve the correct CMYK combinations even after repeated trials.

An automated spot color editor (ASCE) method includes determining appropriate target values for a selected color within a print job. The selected color may be described as being within a color space such as reflectance spectra, L*a*b*, XYZ, LHC, CMYK, RGB, parameters describing color, or a color number. The automated spot color editor modifies or adjusts the selected color by selecting a quality level and a maximum number of iterations. During iterations it computes the CMYK recipe for each spot color until a quality level is reached.

CMYK recipes are computed inside an algorithm module. The basic algorithm requires the use of gamut classification to find the CMYK recipe accurately and in the course of doing so save toner usage. Also, this kind of classification can help to improve the overall attainable gamut by fully utilizing the black separation.

The (ASCE) enhances the accuracy performance of spot colors (arbitrary or customer specified) with inline or offline sensors, using a sensitivity matrix. The matrix is computed for each spot color using a gamut class assignment algorithm and gamut class models (CMY->Lab, MYK->Lab, CYK->Lab, CMK->Lab). Gamut class models are obtained using printer characterization.

A common practice for obtaining the printer model is by printing and measuring test patches over the whole printer gamut. The numerical model with printer characterization data uses a large number of colors (2197 patches×2 replicas×4 gamut classes=17576 colors) for printing and measuring whenever the characterization is called for. Measurement of this kind of patch set is required when the ASCE algorithms each require porting to different machines The measurement process is time consuming and expensive, even when the Inline Spectral sensors (ILS) are used.

There is thus a need for providing an accurate color model without an especially time consuming printer characterization process involving a relatively large number of experimental test patches.

There is also always a need for improved accuracy in the ASCE feature, and in particularly enhanced accuracy in the performance of any spot colors (arbitrary or customer specified) using inline or offline sensors.

BRIEF SUMMARY

A method is provided for developing a model for a printer from a selected set of experimental test patches. The model includes representing a color gamut with the printer as a composite of gamut classes wherein each gamut class is comprised of a subset of printer color separations. A set of test patches are run within one of the gamut classes wherein the set includes test patches relatively or orthogonally disposed within a predetermined matrix to identify printer operation.

The embodiments include a color printer including a spot color editor controller having a sensitivity matrix model developed from a plurality of experimental patches to define printer operation. The sensitivity matrix is comprised of coefficients computed from the orthogonal disposition of the experimental patches within a selected sub gamut of a color printer gamut. A plurality of replicas of the experimental patches are run for achieving statistical significance.

DETAILED DESCRIPTION

The subject embodiments relate to model development for a color printer using a Design of Experiments (DoE) methodology. In particular, the embodiments utilized vastly reduce the number of experimental test patches to generate the characteristic data necessary to compile an accurate characterization and representation of the printer. The model uses less than twenty test patches with five replicas per gamut class selectively placed in the color space of choice such as CMY, MYK, CYK and CMK. A central composite design methodology selectively places the test patches with a design matrix to achieve orthogonally disposed characteristic data. An efficient model may be successfully extracted with comparably few measurements for controlling spot colors accurately.

Figure 1:
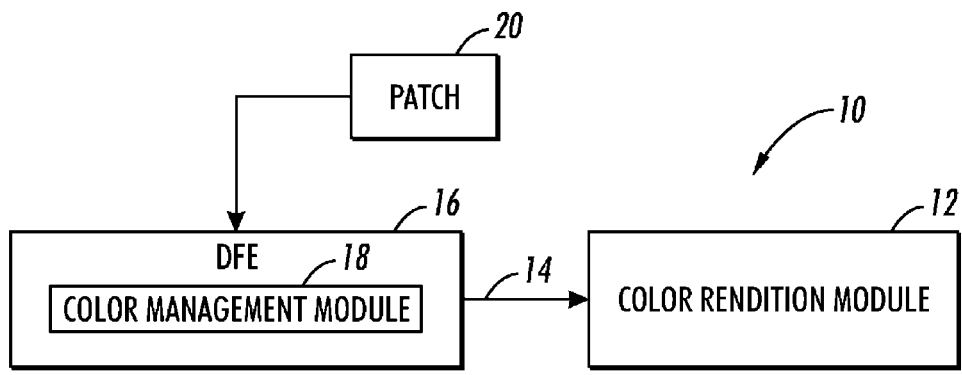
FIG. 1 is a block diagram of a simplified printer architecture indicative of an application space for the subject embodiments.

More particularly, with reference to FIG. 1, a relevant printer architecture comprised of a color management system 10 includes an input-output terminal having a color rendition module 12 whose output controls a printer laser (not shown). The input 14 to the module 12 comprises contone C,M,Y,K values of a desired image. The digital front end 16 to the module includes a color management module 18 which transforms RGB image values to the C,M,Y,K values by applying gray balance tone reproduction curves. In some printers, often tone reproduction curves are used to linearize each separation, instead of gray balance. Such architecture is a conventional application space for the subject embodiments.

Characterization of the printer comprises generating a model within the color management module 18 so that desired and accurate color outputs from the printer are obtained from selected test patches 20.

The present embodiments relate to the use of Design of Experiments (DoE) methodologies to drastically reduce the number of test patches. A DoE methodology allows maximum orthogonality among test patch running so that the minimum of test patches are required, while the important interactions between C, M, Y and K color values are retained. An important aspect of the DoE based modeling is that a minimum number of test patch experimentation can be implemented which is still statistically representative to achieve a 95% confidence level in an ultimately determinable characterization model.

Figure 3:
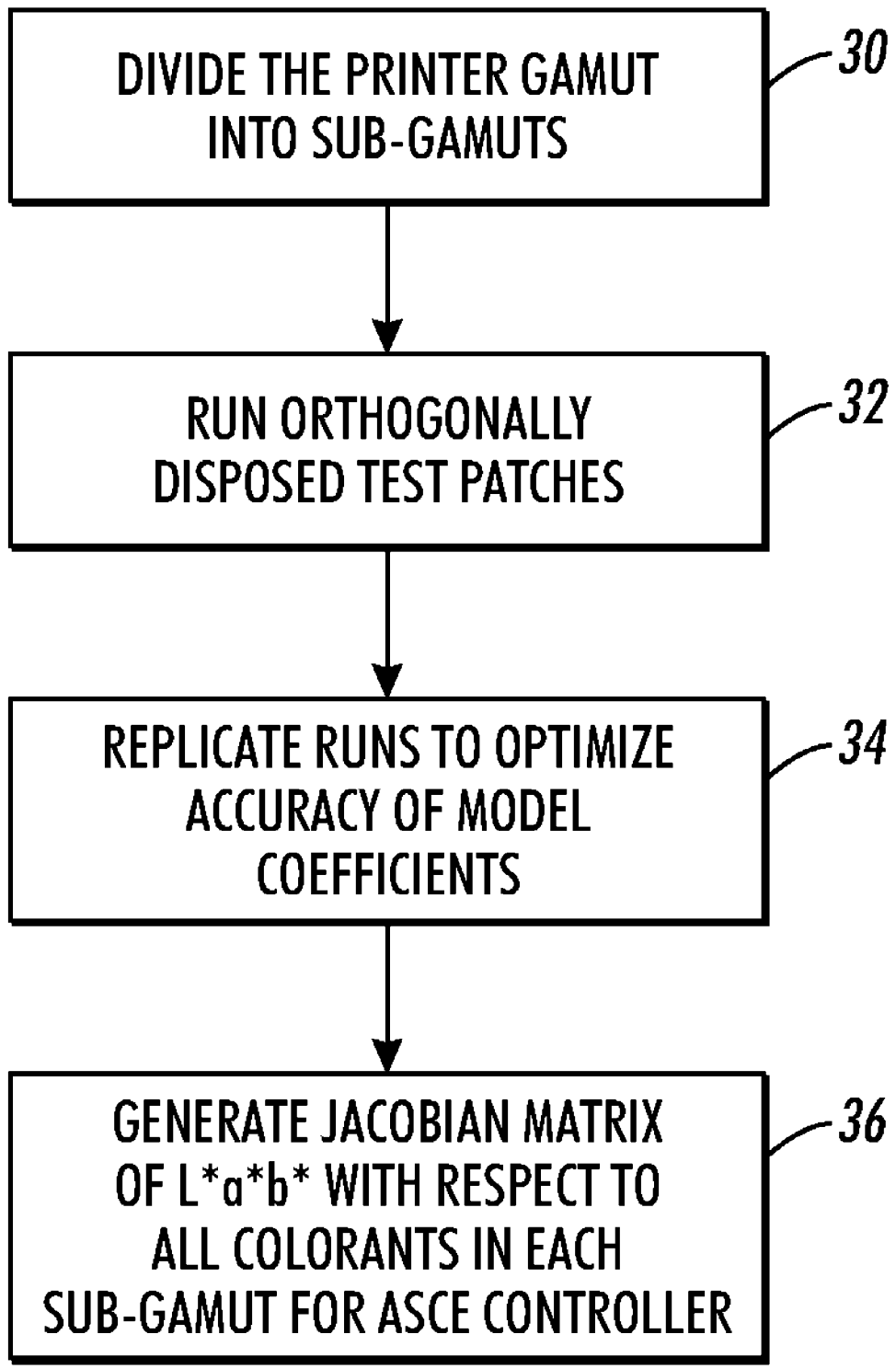
FIG. 3 is a flowchart illustrating an embodiment method.

With particular reference to FIG. 3, a first step in the modeling process is the dividing 30 of the printer gamut into four or more sub gamuts called gamut classes, such as CMY to L*a*b*, CMK to L*a*b*, CYK to L*a*b* and MYK to L*a*b*. DoE methods, and in particular a Central Composite Design method, are applied to each of the sub gamuts by running 32 orthogonally disposed test patches. A flexible and efficient second order modeling design for quantitative factors is the Box-Wilson or Central Composite Design (CCD). For three factors (e.g., C, M and Y), the Box-Wilson design with three levels for each factor is shown below in Table 1. This design allows all two level interactions. For example, for the CMY to L*a*b* gamut, it models the interactions terms CM, MY and CY, as well as C^2, M^2, Y^2 and CMY.

TABLE 1

| | Factor | | |
|---|---|---|---|
| Patch | a | b | c |
| 1 | −1 | −1 | −1 |
| 2 | −1 | −1 | +1 |
| 3 | −1 | +1 | −1 |
| 4 | −1 | +1 | +1 |
| 5 | +1 | −1 | −1 |
| 6 | +1 | −1 | +1 |
| 7 | +1 | +1 | −1 |
| 8 | +1 | +1 | +1 |
| 9 | 0 | 0 | 0 |
| 10 | 0 | 0 | 0 |
| 11 | 0 | 0 | 0 |
| 12 | 0 | 0 | 0 |

TABLE 1-continued

| | Factor | | |
|---|---|---|---|
| Patch | a | b | c |
| 13 | 0 | 0 | 0 |
| 14 | 0 | 0 | 0 |
| 15 | α | 0 | 0 |
| 16 | −α | 0 | 0 |
| 17 | 0 | α | 0 |
| 18 | 0 | −α | 0 |
| 19 | 0 | 0 | α |
| 20 | 0 | 0 | −α |

Table 1 represents a coding of the orthogonal experimentation intended. For each factor, e.g., cyan, the designed values, from low to high, is $-\alpha$, $-1$, $0$, $+1$, $\alpha$. Thus, $-\alpha$ corresponds to 0 digital count, while $\alpha$ corresponds to 255 digital counts. The center point, 0, corresponds to 127.5 digital counts, $-1$ corresponds to $127.5-127.5/\alpha$ digital counts, and $+1$ corresponds to $127.5+127.5/\alpha$ digital counts. The value of $\alpha$ depends on whether the design is face centered ($\alpha=1$) rotatable ($\alpha=1.68$) or spherical ($\alpha=1.73$). Table 1 can be used for all three designs. Second, while six center points are shown for better orthogonality, less central points will not be detrimental for the design.

Figure 2:
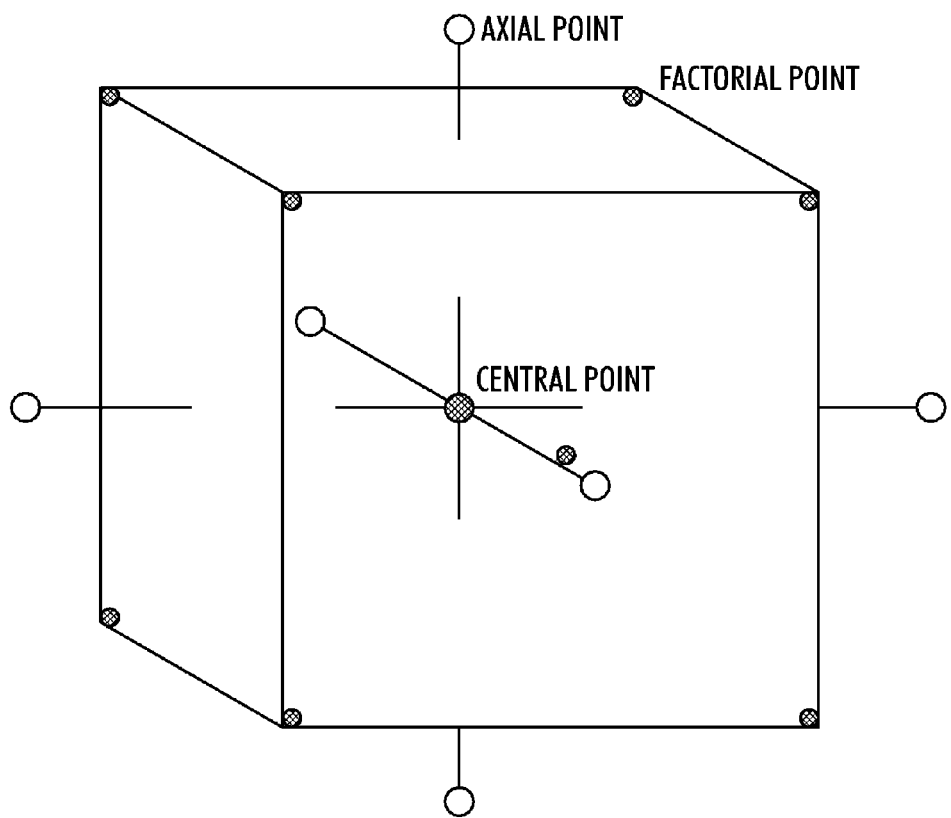
FIG. 2 is a graphical representation of a Central Composite Design modeling for a three factor design corresponding to a three color separation sub gamut.

Such a Central Composite Design modeling corresponds to a cubic graphic representation (FIG. 2). The twenty patches (i.e., runs 1-20) each correspond to a sub gamut class testing. For example, for the CMY sub gamut class with face centered design, the factors a=C, b=M, c=Y, −1 corresponds to a concentration color value of 0, while +1 is a concentration value of 255 (256 different color levels). With reference to the cube, patch number 1 corresponds to a 0 value of all C, M, and Y, while patch number 8 is saturation of 255 for each colorants. Patches 1-8 correspond to the corners or factorial points of the cube. Patches 9-14 correspond to the central point of the cube. Patches 15-20 correspond to facial points depending upon whether design parameters are for faced centered, rotatable or spherical modeling as noted above.

For statistical significance, five replicas of experiments for Table 1 are generally performed 34. The design will generate the following mathematical model for L*, a* and b* (continuing to take CMY to L*a*b* gamut as the example):

$$L^* = L_0 + \beta_{11}C + \beta_{12}M + \beta_{13}Y + \beta_{14}CM + \beta_{15}CY + \beta_{16}MY + \beta_{17}C^2 + \beta_{18}M^2 + \beta_{19}Y^2 + \beta_{110}CMY \quad (1)$$

$$a^* = a_0 + \beta_{21}C + \beta_{22}M + \beta_{23}Y + \beta_{24}CM + \beta_{25}CY + \beta_{26}MY + \beta_{27}C^2 + \beta_{28}M^2 + \beta_{29}Y^2 + \beta_{210}CMY \quad (2)$$

$$b^* = b_0 + \beta_{31}C + \beta_{32}M + \beta_{33}Y + \beta_{34}CM + \beta_{35}CY + \beta_{36}MY + \beta_{37}C^2 + \beta_{38}M^2 + \beta_{39}Y^2 + \beta_{330}CMY \quad (3)$$

In the above equations, $L_0$, $a_0^*$, $b_0^*$ are offset parameters reflecting values when C=M=Y=0. The other terms reflect the contribution of C, M, and Y and their interactions to L*a*b*. For example, $\beta_{11}C$ is the cyan contribution to L*, and $\beta_{24}CM$ is the contribution of the interaction between cyan and magenta to a*.

The coefficients are determined by optimizing the fit to the five replica measurements of Table 1. Once the coefficients are obtained, the Jacobian matrix of L*, a* and b* with respect to all colorants in each sub-gamut can be determined 36. The Jacobian matrix is then used for the printer ASCE controller.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The claims can encompass embodiments in hardware, software or combination thereof.

The word "printer" as used herein encompasses any apparatus such as a digital copier, bookmaking machine, facsimile machine, multifunction machine, etc., which performs a print outputting function for any purpose. Similarly, the colorants used for the printer may not limit to cyan (C), magenta (M), yellow (Y) and black (K). The method can be easily extended to more than four colorant printers (e.g., Cyan, Magenta, Yellow, Black, Orange, Violet etc.)

The invention claimed is:

1. A method for developing a model profile for a printer from a selected set of test patches, including:
representing a color gamut of the printer as a composite of gamut classes wherein each gamut class is comprised of a subset of printer color separations and
running by a processing module the set of test patches within a one of the gamut classes wherein the set includes test patches relatively orthogonally disposed within a predetermined matrix to identify printer operation, wherein the predetermined matrix includes a cubic graphic representation and the set of test patches correspond to factorial points and a central point of a cube.

2. The method of claim 1 wherein the patches further correspond to facial points of the cube.

3. The method of claim 1 wherein the running includes a plurality of replicas of the central point.

4. The method of claim 3 wherein the running includes replicating a plurality of the set of test patches.

5. The method of claim 1 wherein the printer color gamut comprises several gamut classes including CMY to L*a*b*, CMK to L*a*b*, CYK to L*a*b*, and MYK to L*a*b*.

6. The method of claim 5 wherein the running includes applying a central composite design to each of the gamut classes having two levels of interaction.

7. The method of claim 6 wherein the running includes twenty test patches comprising 5 replicas of a same patch to enhance orthogonality.

8. The method of claim 6 further including generating a Jacobian matrix of L*a*b* representative of a color model for use as an ASCE controller.

9. A color printer comprising a spot color editor controller using a sensitivity matrix model to characterize the printer, the sensitivity matrix model being developed from a plurality of experimental patches to define printer operation, wherein a sensitivity matrix is comprised of coefficients computed from an orthogonal disposition of the experimental patches within a selected sub gamut of a color printer gamut, and a plurality of replicas of the experimental patches for achieving statistical significance
wherein the orthogonal disposition of the experimental patches comprises a central composite modeling design having factorial points correspond to minimum and maximum sub gamut values.

10. The color printer of claim 9 wherein the coefficients are generated with twenty experimental patches and five running replicas of the experimental patches.

11. The color printer of claim 9 wherein the central composite modeling includes experimental patches corresponding to intermediate sub gamut values.

12. The color printer of claim 11 wherein the modeling comprises a cubic representation of the sub gamut, the factorial points correspond to corner points of the cubic representation, the intermediate sub gamut values correspond to facial points, and the central point corresponds to a cube center point.

13. The color printer of claim 12 wherein the coefficients are generated from replica running of the central point to enhance statistical significance.

* * * * *